United States Patent
Quan et al.

(10) Patent No.: US 7,728,904 B2
(45) Date of Patent: Jun. 1, 2010

(54) SKIN COLOR PRIORITIZED AUTOMATIC FOCUS CONTROL VIA SENSOR-DEPENDENT SKIN COLOR DETECTION

(75) Inventors: Shuxue Quan, San Diego, CA (US); Chinchuan Andrew Chiu, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 942 days.

(21) Appl. No.: 11/402,481

(22) Filed: Apr. 11, 2006

(65) Prior Publication Data

US 2007/0104472 A1 May 10, 2007

Related U.S. Application Data

(60) Provisional application No. 60/734,992, filed on Nov. 8, 2005.

(51) Int. Cl.
*H04N 5/232* (2006.01)
(52) U.S. Cl. ................................... 348/349
(58) Field of Classification Search ................ 348/349, 348/364, 223.1, 208.7, 208.11, 345, 208.99; 382/170, 167; 396/421
See application file for complete search history.

(56) References Cited

U.S. PATENT DOCUMENTS

| | | | |
|---|---|---|---|
| 5,907,629 A * | 5/1999 | Funt et al. | 382/162 |
| 6,249,317 B1 * | 6/2001 | Hashimoto et al. | 348/364 |
| 2004/0179719 A1 * | 9/2004 | Chen et al. | 382/118 |
| 2005/0207643 A1 * | 9/2005 | Lee et al. | 382/165 |

* cited by examiner

*Primary Examiner*—Tuan Ho
(74) *Attorney, Agent, or Firm*—Timothy F. Loomis; Espartaco Diaz Hidalgo

(57) ABSTRACT

The disclosure is directed to techniques for automatic focus control. The automatic focus control techniques prioritize focus of a camera based on skin tone using a skin color detection approach which is intrinsically image sensor-dependent. Sensor-dependent skin color detection to support automatic skin tone prioritized focus control in a camera can enhance the focus of people in the scene. The techniques may be especially useful in digital video camera design, digital still photo camera design, and sensor applications involving people tracking. Sensor-dependent skin color detection is performed once a specific sensor is characterized by taking several raw images of a standard color test target in controlled illumination conditions. Sensor-dependent skin color detection can provide high detection precision and reliability. With sensor-dependent skin color detection, the focus of a camera can be automatically adjusted to prioritize regions of an image containing skin tones.

51 Claims, 13 Drawing Sheets
(4 of 13 Drawing Sheet(s) Filed in Color)

| Dark skin 0.400 0.350 10.1 | Light skin 0.377 0.345 35.8 | Blue sky 0.247 0.251 19.3 | Foliage 0.337 0.422 13.3 | Blue flower 0.265 0.240 24.3 | Bluish green 0.261 0.343 43.1 |
|---|---|---|---|---|---|
| Orange 0.506 0.407 30.1 | Purplish blue 0.211 0.175 12.0 | Moderate red 0.453 0.306 19.8 | Purple 0.285 0.202 6.6 | Yellow green 0.380 0.489 44.3 | Orange yellow 0.473 0.438 43.1 |
| Blue 0.187 0.129 6.1 | Green 0.305 0.478 23.4 | Red 0.539 0.313 12.0 | Yellow 0.448 0.470 59.1 | Magenta 0.364 0.233 19.8 | Cyan 0.196 0.252 19.8 |
| White 0.310 0.316 90.0 | Neutral 8 0.310 0.316 59.1 | Neutral 6.5 0.310 0.316 36.2 | Neutral 5 0.310 0.316 19.8 | Neutral 3.5 0.310 0.316 9.0 | Black 0.310 0.316 3.1 |

FIG. 11A
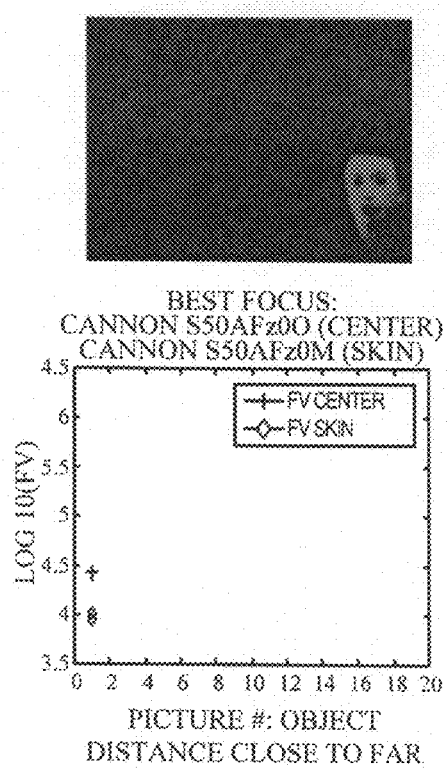
FIG. 11B
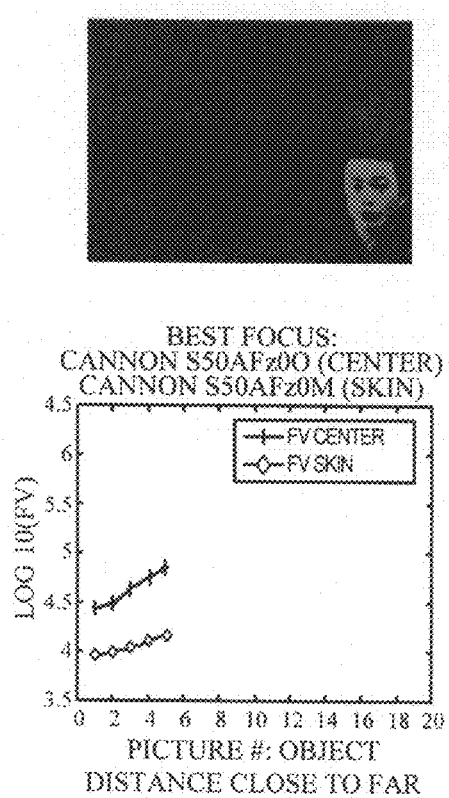

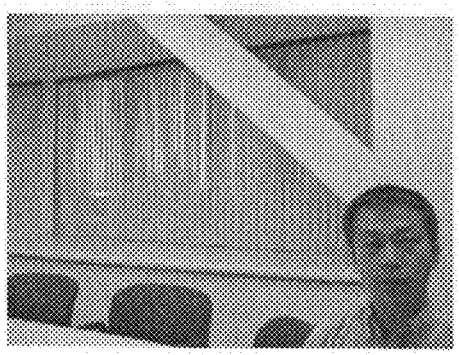
FIG. 11C
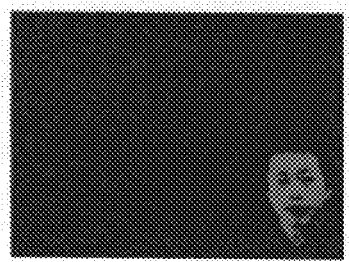
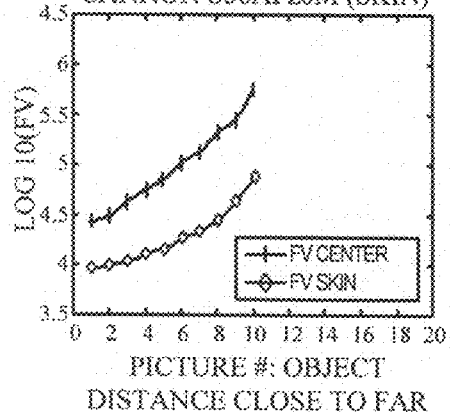
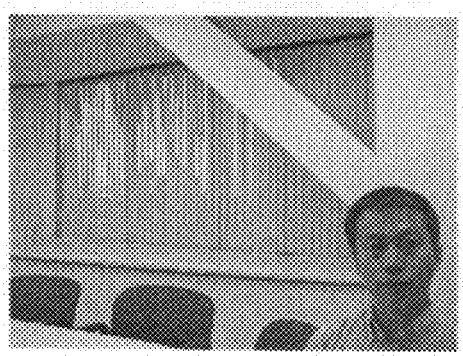
FIG. 11D
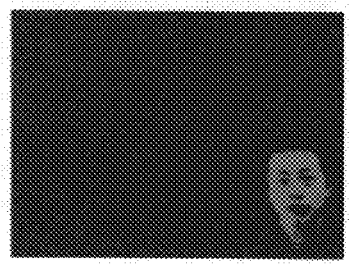
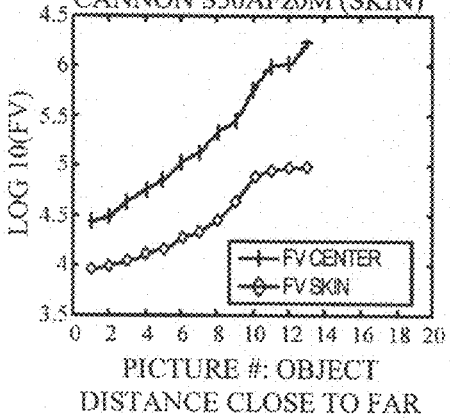

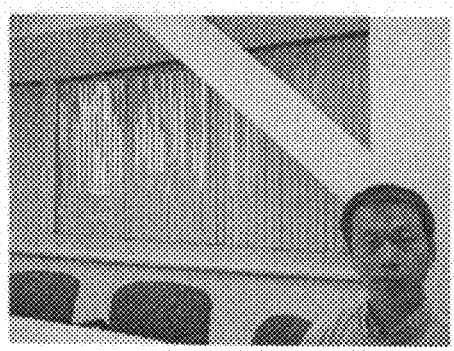
FIG. 11E
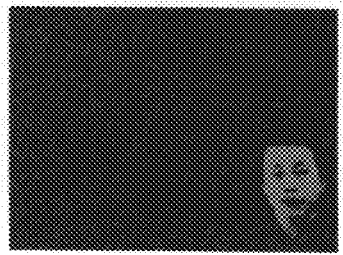
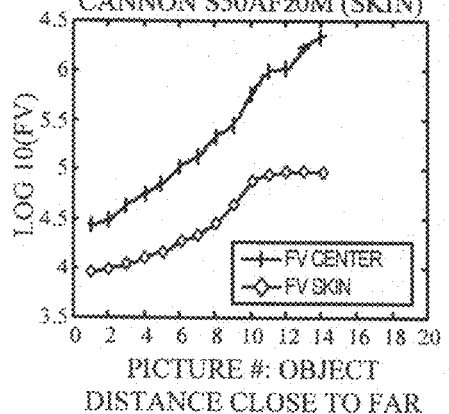
FIG. 11F
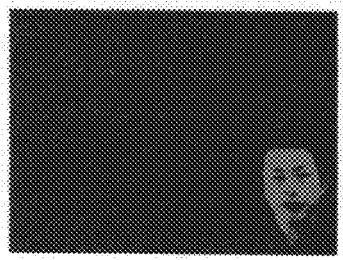
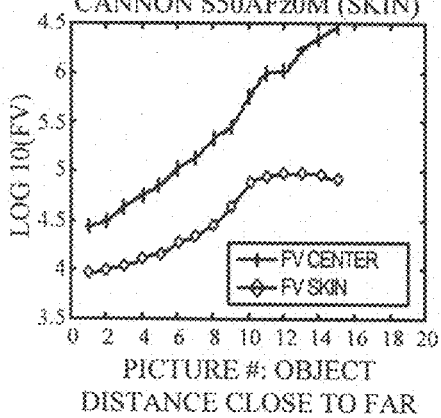

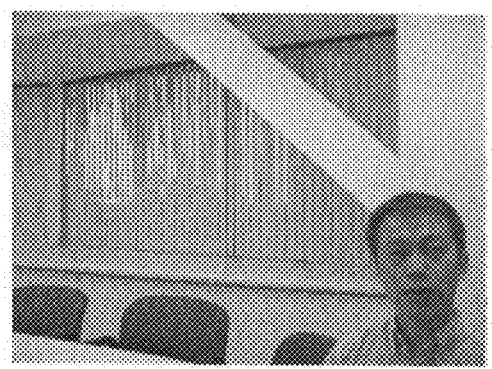
FIG. 11G
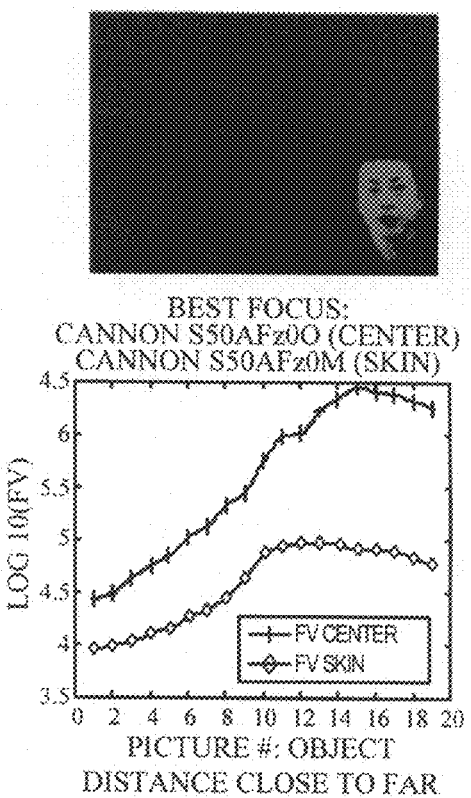

SKIN COLOR PRIORITIZED AUTOMATIC FOCUS CONTROL VIA SENSOR-DEPENDENT SKIN COLOR DETECTION

This application claims the benefit of U.S. Provisional Application No. 60/734,992, filed Nov. 8, 2005.

TECHNICAL FIELD

This disclosure relates to image scene capture and more particularly automated control of image capture characteristics.

BACKGROUND

The presence of skin color is useful as a cue for detecting people in real-world photographic images. Skin color detection plays an important role in applications such as people tracking, blocking mature-content web images, and facilitating human-computer interaction. Skin color detection may also serve as an enabling technology for face detection, localization, recognition, and/or tracking; video surveillance; and image database management. These and other applications are becoming more significant with the adoption of portable communications devices, such as cellular telephones, that are equipped with digital video or still photo cameras. For example, the ability to localize faces may be applied to a more efficient use of bandwidth by coding a face region of an image with better quality and using a higher degree of compression on the image background.

The reflectance of a skin surface is usually determined by its thin surface layer, or "epidermis," and an underlying thicker layer, or "dermis." Light absorption by the dermis is mainly due to ingredients in the blood such as hemoglobin, bilirubin, and beta-carotene, which are basically the same for all skin types. However, skin color is mainly determined by the epidermis transmittance, which depends on the dopa-melanin concentration and hence varies among human races.

Skin color appearance can be represented by using this reflectance model and incorporating camera and light source parameters. The main challenge is to make skin detection robust to the large variations in appearance that can occur. Skin appearance changes in color and shape, and it is often affected by occluding objects such as clothing, hair, and eyeglasses. Moreover, changes in intensity, color, and location of light sources can affect skin appearance, and other objects within the scene may complicate the detection process by casting shadows or reflecting additional light. Many other common objects are easily confused with skin, such as copper, sand, and certain types of wood and clothing. An image may also include noise appearing as speckles of skin-like color.

One conventional approach to skin detection begins with a database of hundreds or thousands of images with skin area (such as face and/or hands). This database serves as a training surface set from which statistics distinguishing skin regions from non-skin regions may be derived. The color space is segmented according to these statistics, and classifications are made based on the segmentation. One disadvantage is that the database images typically originate from different cameras and are taken under different illuminations.

SUMMARY

In general, the disclosure is directed to techniques for automatic focus control in an imaging device, e.g., a camera, based on skin tone detection within an image scene. The automatic focus control techniques prioritize focus based on skin tone, and may use a skin color detection approach which is intrinsically image sensor-dependent. Sensor-dependent skin color detection to support automatic skin tone prioritized focus control in a camera can enhance the focus of people in the scene. The techniques may be especially useful in digital video camera design, digital still photo camera design, and sensor applications involving people tracking.

Sensor-dependent skin color detection is performed once a specific image sensor included in a camera is characterized by taking several raw images of a standard color test target in controlled illumination conditions. Sensor-dependent skin color detection can provide high detection precision and reliability, which is different from the common sensor-independent skin color detection. With sensor-dependent skin color detection, the focus of a camera can be automatically adjusted to prioritize regions of an image scene containing skin tones.

In one embodiment, the disclosure provides a method comprising obtaining an image scene with an image sensor included in a camera and identifying one or more regions of the image scene including skin tone pixels. The method also includes automatically controlling focus of the camera based on the identified one or more regions. Automatically controlling focus of the camera may include controlling focus to emphasize the identified one or more regions.

In another embodiment, the disclosure provides a computer-readable medium comprising instructions that cause the programmable processor to obtain an image scene with an image sensor included in a camera and identify one or more regions of the image scene including skin tone pixels. The instructions then cause the programmable processor to automatically control focus of the camera based on the identified one or more regions.

In a further embodiment, the disclosure provides an imaging device comprising an image sensor that obtains an image scene and a skin region identification module that identifies one or more regions of the image scene including skin tone pixels. The imaging device also includes a focus controller that automatically controls focus of the imaging device based on the identified one or more regions.

In this description, techniques for sensor-dependent automatic focus control for prioritization of skin tones are described. Exemplary techniques for image sensor characterization are first described, and may be useful in support of sensor-dependent automatic focus control for prioritization of skin tones, in accordance with some embodiments of this disclosure.

The techniques described herein may be implemented in hardware, software, firmware, or any combination thereof. If implemented in software, the techniques may be realized in part by a computer readable medium comprising program code containing instructions that, when executed by a programmable processor, performs one or more of the methods described herein.

The details of one or more embodiments are set forth in the accompanying drawings and the description below. Other features, objects, and advantages will be apparent from the description and drawings, and from the claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 11A-11G are a series of captured images including the associated skin color detection as well as the change of FV for a certain focusing distance step.

DETAILED DESCRIPTION

Figure 1:
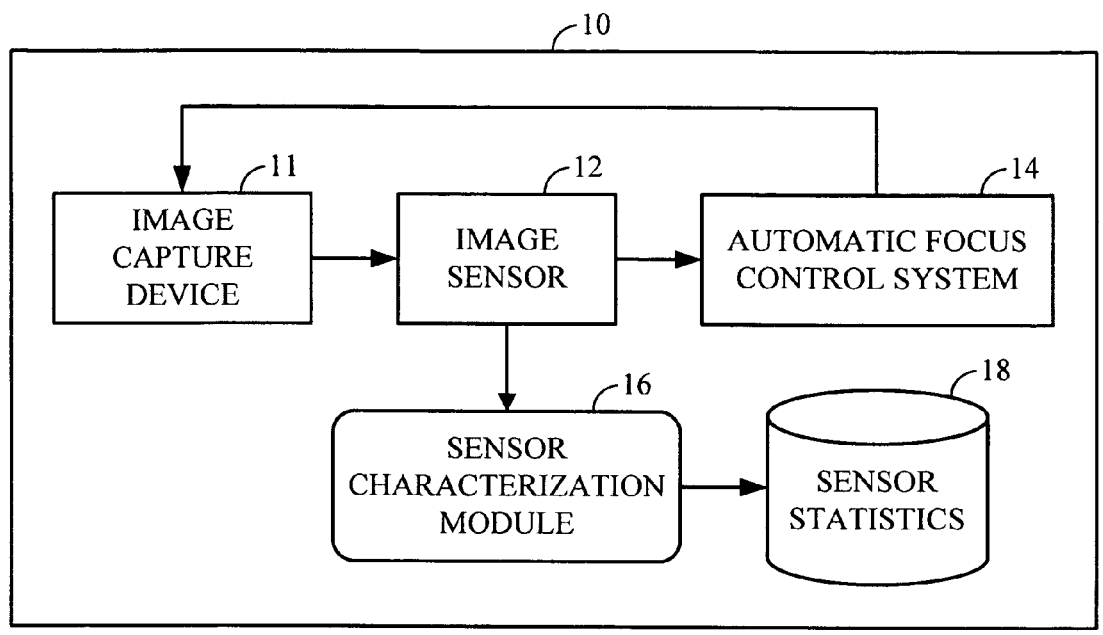
FIG. 1 is a block diagram illustrating an exemplary camera incorporating an automatic focus control system.

FIG. 1 is a block diagram illustrating an exemplary camera 10 incorporating an automatic focus control system 14. Camera 10 also includes an image capture device 11, an image sensor 12, a sensor characterization module 16, and a database storing sensor statistics 18. Image capture device 11 may include one or more camera lenses capable of capturing an image scene. Automatic focus control system 14 implements techniques for prioritizing focus control in camera 10 based on skin tone detection within the image scene. Automatic focus control system 14 prioritizes focus based on skin tone, and may use a variety of skin tone detection approaches to identify skin regions within the image scene.

Camera 10 may comprise a digital video camera, a digital still photo camera, or another imaging device. In some cases, camera 10 may be included within a wireless communication device, such as a so-called camera phone or video phone. In other cases, images output from camera 10 may be used in external multimedia applications such as face detection, localization, recognition, and/or tracking; video surveillance; and image database management. In the case of a camera phone or video phone, images output from camera 10 may be applied to an encoder that more efficiently uses bandwidth by coding a skin tone region of an image with better quality and using a higher degree of compression on the image background.

Image capture device 11 may include a lens that establishes a focusing distance between the lens and an object when capturing an image of the object. A sharpness level corresponding to a region of the scene that includes the object may be measured and is referred to herein as the focal value (FV). For example, when camera 10 has the region substantially focused, the FV is at a maximum. Therefore, when the focusing distance changes, the FV corresponding to the region increases, i.e., focuses, or decreases, i.e., unfocuses. In some cases, the lens may be physically movable from a default position within camera 10 in order to change the focusing distance. In other cases, the lens may not be physically movable and image processing within camera 10 may model focusing distance changes by altering the FV of the region of the scene.

Conventionally, a camera may determine a proper focusing distance for a scene by selecting a region of the scene with the largest amount of spatial frequency as including the main object within the scene. The camera may then perform high pass filtering of the selected region to determine the focusing distance that generates the highest FV of the object in the scene. If people are in the scene, it may be expected that the people are well focused. However, due to the fact that the FV of the region containing people may not be the highest in the scene, the camera may confuse people and a complex background with a high spatial frequency. Therefore, the people may not be focused although the background is focused.

On the contrary, automatic focus control system 14 included in camera 10 determines a proper focusing distance for a scene based on skin tone detection within the scene. Automatic focus control system 14 may identify a region of the scene that includes a substantial amount of skin tone pixels as a skin region of the scene. Skin tone detection may be used instead of, or in addition to, spatial frequency detection for automatic focus control. Automatic focus control system 14 may then perform high pass filtering of the skin region to determine the focusing distance that generates the highest FV of the region of the scene. The determined focusing distance may then be fed back to image capture device 11 from automatic focus control system 14 to properly position the lens within image capture device 11. In this way, automatic focus control system 14 may ensure people in the scene are well focused by identifying the regions of the scene containing people and performing skin tone prioritized focus control on the skin regions.

As mentioned above, automatic focus control system 14 may use a variety of skin color detection approaches to identify skin regions within the image scene. As an example, automatic focus control system 14 may use a skin color detection approach that is intrinsically dependent on image sensor 12 included in camera 10. In this way, automatic focus control system 14 may prioritize focus control in camera 10 based on characteristics of image sensor 12 to further enhance the focus of people included in a scene.

Image sensor 12 may comprise a CCD (charge-coupled device) or CMOS (complementary metal-oxide-semiconductor) image sensor. For example, image sensor 12 may comprise a single sensor including three color filters for each color in the RGB (red, green, blue) color space. As another example, image sensor 12 may comprise an array of three separate image sensors for each color in the RGB color space. In general, image sensor 12 refers to an array of sensing elements used in camera 10. In some cases, image sensor 12 may include an array of CCD or CMOS image sensing elements.

Automatic focus control system 14 may perform sensor-dependent skin color detection once sensor characterization module 16 characterizes image sensor 12 and generates sensor statistics 18. Sensor characterization module 16 characterizes image sensor 12 by taking several raw images of a standard color testing target, such as a Macbeth Color Checker chart, commercially available from GretagMacbeth LLC of New Windsor, N.Y., in controlled illuminate conditions. For example, sensor characterization module 16 may image the standard testing target under each of a daylight illuminant (CIE D65), a tungsten light illuminant (CIE A), and a fluorescent light illuminant (TL84). Sensor characterization module 16 then generates sensor statistics 18 for each illuminant based on a correlation of a training surface set of skin color reflectance spectra of image sensor 12 and the reflectance spectra of the standard testing target.

Automatic focus control system 14 may include a skin tone detector that utilizes sensor statistics 18 of image sensor 12 to enhance skin tone prioritized focus control. Automatic focus control system 14 uses sensor statistics 18 of image sensor 12 to identify a skin region within an image scene received from image sensor 12, and focus on the identified skin region relative to background or "central" areas within the image scene. The techniques described herein may be universally applicable to different types of image sensors. Therefore, automatic focus control system 14 may accurately focus skin regions in image scenes captured by different image capture devices based on physical characteristics and processing capabilities of various image sensors.

Sensor-dependent skin color detection can provide high detection precision and reliability, which is different from the common sensor-independent skin color detection. With sensor-dependent skin color detection, the focus of a camera can be automatically adjusted to prioritize regions of an image scene containing skin tones. In this description, techniques for sensor-dependent automatic focus control for prioritization of skin tones are described. Exemplary techniques for sensor characterization are first described, and may be useful in support of the techniques for sensor-dependent automatic focus control for prioritization of skin tones, in accordance with this disclosure.

Automatic focus control system 14 may be implemented in hardware, software, firmware or any combination thereof. For example, various aspects of automatic focus control system 14 may be implemented within one or more digital signal processors (DSPs), microprocessors, application specific integrated circuits (ASICs), field programmable logic arrays (FPGAs), or any other equivalent integrated or discrete logic circuitry, as well as any combinations of such components. The term "processor" may generally refer to any of the foregoing logic circuitry, alone or in combination with other logic circuitry. When implemented in software, the functionality ascribed to automatic focus control system 14 may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure.

Figures 2, 3:
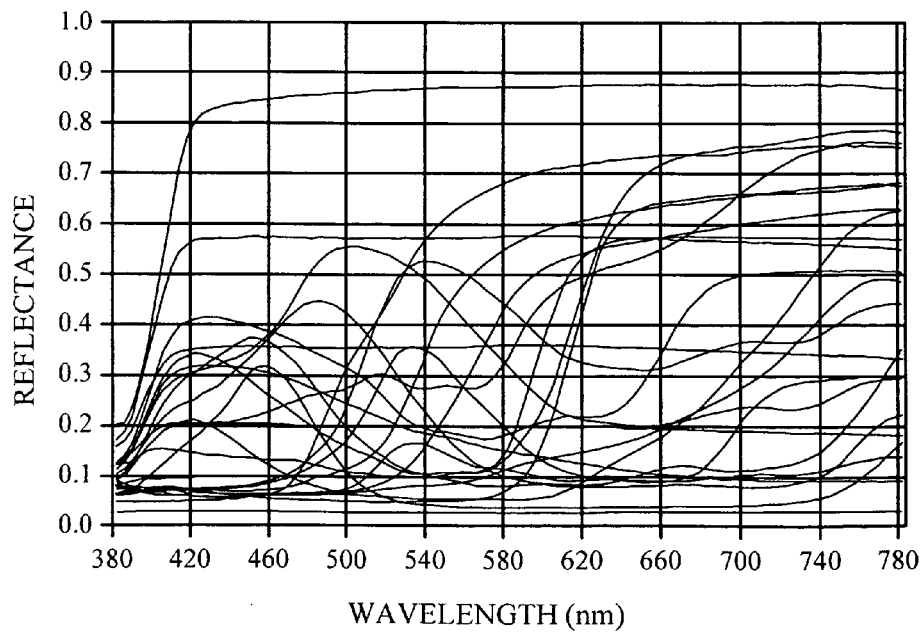
FIG. 2 is a schematic diagram of the Macbeth ColorChecker testing target, in which the location of each color patch is indicated with the name of the corresponding color and its value in the CIE xyY color space.
FIG. 3 is a plot of the reflectance spectra of the 24 color patches of the Macbeth ColorChecker testing target over the range of 380 to 780 nm.

FIG. 2 is a schematic diagram of the Macbeth ColorChecker testing target, in which the location of each color patch is indicated with the name of the corresponding color and its value in the CIE xyY color space. FIG. 3 is a plot of the reflectance spectra of the 24 color patches of the Macbeth ColorChecker testing target over the range of 380 to 780 nm. Other examples of standardized testing target sets include without limitation the ColorCheckerDC target set (Amazys Holding AG; having 237 color patches); the 1269 Munsell color patches (Munsell Book of Color, Munsell Color Corporation, 1976); IT8-7.2 (reflective) target sets such as a Kodak Q-60R1 target set, which contains approximately 260 color patches printed on photographic paper (Eastman Kodak Company, Rochester, N.Y.); and the Kodak Q-13 and Q-14 target sets.

Figure 4:
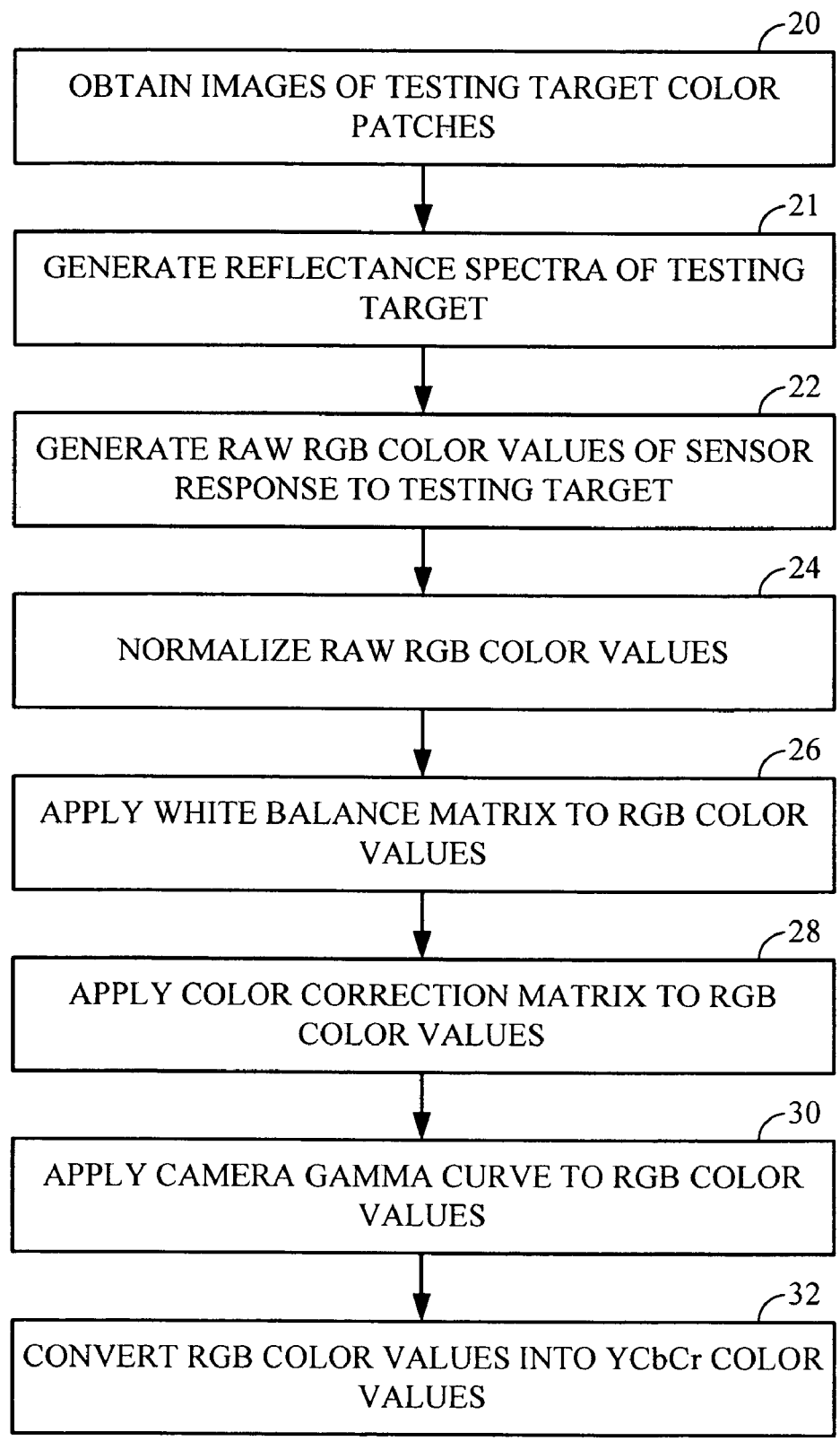
FIG. 4 is a flowchart illustrating an exemplary operation of calibrating an image sensor included in a camera based on images of a standard testing target.

FIG. 4 is a flowchart illustrating an exemplary operation of calibrating image sensor 12 included in camera 10 based on images of a standard testing target. For purposes of illustration, the standard testing target will generally be described herein as the Macbeth ColorChecker testing target illustrated in FIG. 2. However, the disclosure should not be limited in this respect. In other embodiments, the standard testing target may another testing target including any of those listed above. The image sensor calibration operation will be described in reference to FIG. 1.

First, image capture device 11 of camera 10 obtains images of the color patches of the Macbeth ColorChecker testing target (20). Image sensor 12 then scans each of the color patches and generates reflectance spectra of the Macbeth ColorChecker testing target under several controlled illuminant conditions (21). For example, image sensor 12 may generate a reflectance spectra of the testing target under each of a daylight illuminant (CIE D65), a tungsten light illuminant (CIE A), and a fluorescent light illuminant (TL84).

Sensor characterization module 16 included in camera 10 generates raw RGB color values of the response of image sensor 12 to the Macbeth Color Checker testing target under each of the illuminant conditions (22). Sensor characterization module 16 may subject the raw RGB color values to de-mosaicing, flat-fielding and black-level subtraction to normalize the raw RGB color values (24). The raw RGB signals for each color patch of the Macbeth ColorChecker testing target under each illuminant is normalized by flat fielding through a uniform gray plane capture and subtraction of constant black level:

$$RGB = \frac{RGB - BlackLevel}{GrayPlane - BlackLevel}, \quad (1)$$

where GrayPlane is the raw signal on the gray plane which is corresponding to the Macbeth ColorChecker testing target. Normalizing the raw RGB color signals also removes any existing non-uniform illumination and the sensor nonlinear response.

Sensor characterization module 16 applies the white balance matrix to the normalized RGB color values (26). The white balance matrix may be calculated on-spot during actual photographing. However, during calibration, the white balance matrix may be manually determined based on the gray patches of the Macbeth ColorChecker testing target for the different illuminants. Sensor characterization module 16 then applies the color correction matrix to the RGB color values (28) and applies the camera gamma curve to the RGB color values (30). Finally, because most image processing systems use the YCbCr (luminance, chrominance blue, chrominance red) color space, sensor characterization module 16 converts the RGB color values to YCbCr color values (32).

Sensor characterization module 16 calibrates characteristics of image sensor 12 by following the imaging procedure set forth above. Sensor characterization module 16 calibrates the color correction matrix and the camera gamma curve based on the response of image sensor 12 to the Macbeth ColorChecker testing target under the different illuminants. Since the mean value of the digital counts in a cropped area from the captured image of each color patch in the Macbeth ColorChecker testing target is the raw RGB color signal, sensor characterization module 16 also obtains noise statistics. Sensor characterization module 16 may represent the noise statistics as the standard deviation of the digital counts in the same area from the captured image of each testing target color patch.

Figure 5:
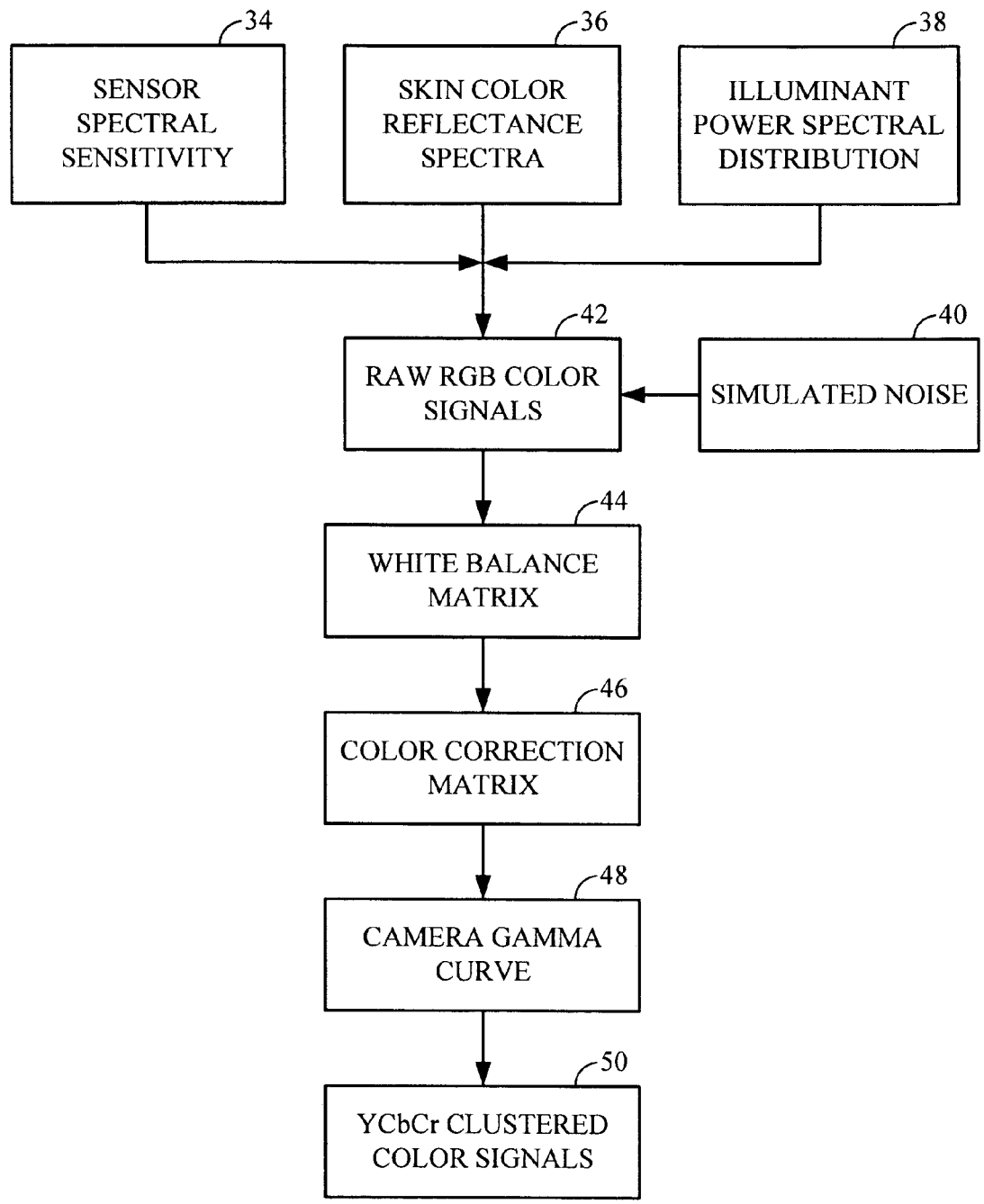
FIG. 5 illustrates a direct processing operation of a sensor characterization module creating sensor-specific statistics for each of the different illuminant conditions.

FIG. 5 illustrates a direct processing operation of sensor characterization module 16 creating sensor-specific statistics 18 for each of the different illuminant conditions. Sensor statistics 18 include skin color clusters defined in a color space such as the YCbCr color space or the RGB color space. Sensor spectral sensitivity 34, skin color reflectance spectra 36, and illuminant power spectral distribution 38 are used to define the skin color cluster for a certain illuminant condition. Skin color reflectance spectra 36 may comprise a database of measured skin color reflectance spectra for human skin tone training surfaces. Illuminant power spectral distribution 38 comprises the relative energy of an illuminating light source, such as daylight, tungsten light or fluorescent light.

Assuming the sensor spectral sensitivity functions 34 are known, sensor characterization module 16 obtains the raw RGB color signals 42 by equation (2) as follows:

$$RGB = \int_{400nm}^{700nm} SS(\lambda) \cdot L(\lambda) \cdot R(\lambda) d\lambda, \quad (2)$$

where RGB denotes the raw RGB color signals 42 produced by image sensor 12, $SS(\lambda)$ denotes the sensor spectral sensitivity 34 as a function of wavelength $\lambda$, $L(\lambda)$ denotes the power spectral distribution of the illuminating light source 38 as a function of wavelength $\lambda$, and $R(\lambda)$ denotes the reflectance spectrum of the skin surface point being imaged 36 as a function of wavelength $\lambda$. In other cases, a simulation of variation also may be applied to account for variation among different imaging sensors.

As shown in FIG. 5, simulated noise 40 is applied to the raw RGB color signals 42. The simulated noise 40 may be obtained during the calibration of characteristics of image sensor 12 described above. Sensor characterization module 16 then forwards the raw RGB color signals 42 to the signal processing pipeline that includes the white balance matrix 44, the color correction matrix 46, and the camera gamma curve 48.

Because most image processing systems use the YCbCr color space, sensor characterization module 16 then converts the RGB color signals into YCbCr color signals 50. The YCbCr color signals 50 define the skin color clusters of the illuminants. After the skin color clusters for image sensor 12 are defined in the YCbCr color space, the modeled boundaries of the skin tone areas can be used as classifiers for skin tone detection. Sensor characterization module 16 adds the YCbCr color signals 50 to the database that stores sensor statistics 18.

The skin color clusters for each of the illuminant conditions in YCbCr space may be an ellipsoid, which is clustered in the CbCr plane but is adjusted by the Y value. In some cases, the Y range may be partitioned into a number, e.g., 10, of sub ranges. At each sub range, the CbCr boundary of the skin color cluster for a given illuminant is modeled as an elliptical area. The skin color cluster is then used to identify skin tone pixels in any image scene captured by image sensor 12 under the same illuminant condition.

In general, sensor calibration can be time consuming and may require expensive equipment to measure the sensor spectral sensitivity of a specific sensor. For example, the power spectral distribution of the illuminant 38 can typically be measured easily, but the measurement of the sensor spectral sensitivity 34 requires special expensive equipment including monochromator and spectroradiometer. Therefore, it may not be feasible to derive the raw RGB color signals 42 directly from equation (2) given above, although both the illuminant power spectral distribution 38 and the skin color reflectance spectra are achievable. As an alternative approach, sensor characterization module 16 may estimate the sensor spectral sensitivity functions 34 through the imaging of the Macbeth ColorChecker testing target by image sensor 12 under multiple illuminants.

Figure 6:
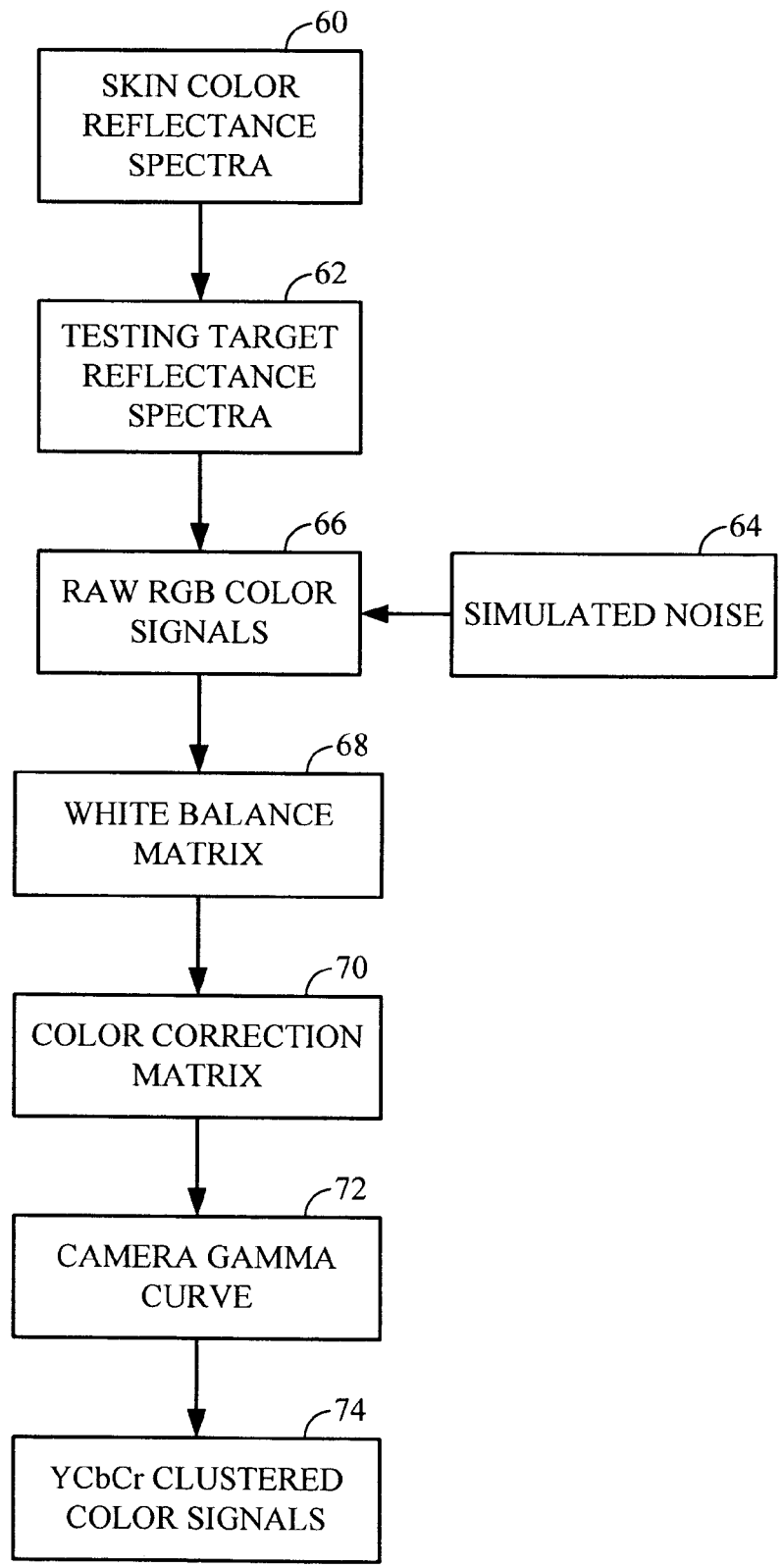
FIG. 6 illustrates a correlated processing operation of a sensor characterization module creating sensor-specific statistics for each of the different illuminant conditions.

FIG. 6 illustrates a correlated processing operation of sensor characterization module 16 creating sensor-specific statistics 18 for each of the different illuminant conditions. Sensor statistics 18 include skin color clusters defined in a color space such as the YCbCr color space or the RGB color space. In the illustrated embodiment, the skin color reflectance spectra 60 is represented as the linear combination of the reflectance spectra of the Macbeth ColorChecker testing target 62. For each of the illuminant conditions, the skin color cluster is modeled based on the correlation of the training surface set of skin color reflectance spectra 60 and the reflectance spectra of the standard testing target 62 generated by image sensor 12. Skin color reflectance spectra 60 may comprise a database of measured skin color reflectance spectra for human skin tone training surfaces.

Each skin color reflectance spectra 60 in the database is decomposed into the linear combination of the 24 color patches of the Macbeth ColorChecker testing target illustrated in FIG. 2. The calculated skin color reflectance spectra are consistent with the original skin color reflectance spectra, which ensures that the raw RGB color signals 66 produced by image sensor 12 for the skin color training surface set can be linearly combined from the raw RGB color signals produced by image sensor 12 from the Macbeth ColorChecker testing target.

$$R_{skin} = \sum_{i=1}^{24} b_i R_i^{Macbeth} = \mathbb{R}^{Macbeth} \cdot b \quad (3)$$

where $$b = pinv(\mathbb{R}^{Macbeth}) \cdot R_{skin},$$

where 24 is the number of reflectance spectra of the Macbeth ColorChecker, $R_{skin}$ and $R_i^{Macbeth}$ are the corresponding reflectance of skin color 60 and the ith Macbeth ColorChecker color patch 62, and $\{b_i\}$ is the set of weighting factors to be calculated.

In deriving the coefficient vector b, it may be desirable to reduce or prune the set of basis functions to include only those testing target reflectance spectra 62 that make a significant contribution to the resulting combinations for the particular application. The number of testing target color patches used need not be the same as the number of patches of the target set, e.g., 24, as some patches may not be used and/or patches from more than one target set may be included. Calculation of the coefficient vector b may include a verification operation to compare the original and calculated spectra and/or an error minimization operation to reduce error, possibly including iteration and/or selection among more than one set of basis spectra.

The raw RGB color signals 66 produced by image sensor 12 for the skin color training surface set may be represented as the linear combination of the raw RGB color signals produced by image sensor 12 for the corresponding color patches of the Macbeth ColorChecker testing target. Equation (4) illustrates that when it is assumed that a skin color reflectance spectrum can be approximated by a linear combination of the reflectance spectra of a limited number of Macbeth ColorChecker color patches, the corresponding RGB color signals of the skin color training surface set can be represented by the same linear combination of the RGB signals of the corresponding Macbeth color patches.

$$R_{skin} = \sum_{i=1}^{k} b_i \cdot R_i^{Macbeth} \rightarrow RGB_{skin} = \sum_{i=1}^{k} b_i \cdot RGB_i^{Macbeth}, \quad (4)$$

where k is the number of reflectance spectra of the Macbeth ColorChecker, $\lambda$ is the wavelength, $R_{skin}(\lambda)$ and $R_i^{Macbeth}(\lambda)$ are the corresponding reflectance of skin color and the ith Macbeth ColorChecker color patch, $RGB_{skin}$ and $RGB_i^{Macbeth}$ are the corresponding RGB signal intensity values of skin color and the ith Macbeth ColorChecker color patch and $\{b_i\}$ (i=1, 2, ..., K) is the set of weighting factors to be calculated. The nonlinearity of image sensor 12 may reduce the validity of this linearity propagation. In such case, sensor characterization module 16 may first perform flat-fielding to linearize the raw RGB color signals.

For each skin color reflectance spectra 60, sensor characterization module 16 calculates the raw RGB color signals 66 the linear combination of the raw RGB color signals of the Macbeth ColorChecker color patches under the same illuminant, as indicated below:

$$\begin{pmatrix} R \\ G \\ B \end{pmatrix}_{skin} = \begin{pmatrix} \mathbb{R} \\ \mathbb{G} \\ \mathbb{B} \end{pmatrix}_{Macbeth} \cdot b. \quad (5)$$

To simulate different levels of illumination intensity, sensor characterization module 16 may modify the calculated raw RGB color signals 66 by a scaling factor. The raw RGB color signals 66 can also be modified by adding an appropriate amount of simulated noise 64, which can be measured when the Macbeth ColorChecker testing target is captured by image sensor 12 as described above. Sensor characterization module 16 then adds the noise modified RGB color signals into a database. Sensor characterization module 16 converts the RGB color signals 66 into YCbCr color signals 74 by applying the white balance matrix 68, the color correction matrix 70, and the camera gamma curve 72 to the RGB color signals 66. As described above, color correction matrix 70 and the camera gamma curve are calibrated specifically for image sensor 12 based on the response of image sensor 12 to the Macbeth ColorChecker testing target.

As described above, the skin color clusters may be constructed through capturing images of color patches of the Macbeth ColorChecker testing target using a linear combination. When multiple illuminants are used, without the white balance matrix 68, it has been shown that the area of skin color cluster shifted in the color space, but the white balance matrix 68 will move the skin color cluster closer. The skin color clusters in YCbCr for the different illuminants may be compared to each other to verify that the different illuminants cause an insignificant shift of the skin color clusters after the white balance matrix 68 is applied.

The YCbCr color signals 74 define the skin color clusters of the illuminants. After the skin color clusters for image sensor 12 are defined in the YCbCr color space, the modeled boundaries of the skin tone areas can be used as classifiers for skin tone detection. Sensor characterization module 16 adds the YCbCr color signals 74 to the database that stores sensor statistics 18. The skin color clusters for each of the illuminant conditions in YCbCr space may be an ellipsoid, which is clustered in the CbCr plane but is adjusted by the Y value. In some cases, the Y range may be partitioned into a number, e.g., 10, of sub ranges. At each sub range, the CbCr boundary of the skin color cluster for a given illuminant is modeled as an elliptical area. The skin color cluster is then used to identify skin tone pixels in any image scene captured by image sensor 12 under the same illuminant condition. The correlated image sensor characterization approach described in reference to FIG. 6 significantly reduces the complexity of the image sensor characterization approach described in reference to FIG. 5.

FIGS. 5 and 6 illustrate different processes by which sensor characterization module 16 creates sensor-specific statistics 18 for each of the different illuminant conditions. Both processes result in defined skin color clusters over luminance ranges (Y) for each of the illuminants. Typically, statistical color models used to estimate skin density in chrominance space (CbCr) may comprise one or more of a single Gaussian model, a mixture of Gaussian models, and histograms. The histogram model based on local approximation is simple and efficient, but becomes effective only when training data is sufficiently large. Moreover, the histogram model requires that the camera include additional memory to store the histograms. The Gaussian model based on the global feature of distribution has the advantage of generality. A single Gaussian model is especially simple and efficient. However, the single Gaussian model does not adequately represent the variance of the skin distribution occurring in the situation where illumination varies. To overcome this drawback, a mixture of Gaussian models may be used, but the mixture of Gaussian models tends to be difficult to trained and inefficient The models described above typically identify skin color clusters from among thousands of images. However, even in the skin color clusters, non-skin colors may be contained. Also, the models assume that luminance does not affect the cluster of skin colors in the chrominance plane. However, the luminance does affect the skin color clusters and the clusters are wider when the luminance is in the middle and are smaller otherwise. A number, e.g., 10, of equal spaced luminance (Y) levels may be used to separate skin colors into clusters in the chrominance plane, each of which is modeled with a single Gaussian distribution.

For each luminance range, sensor characterization module 16 models the likelihood of an input chrominance vector X belongs to a skin color cluster by the single Gaussian model:

$$P(X) = \frac{1}{2\pi |\Lambda|^{1/2}} \exp\left[-\frac{1}{2}\lambda^2\right], \quad (6)$$

where $\lambda$ is the Mahalanobis distance defined as:

$$\lambda^2 = (X-\mu)^T \Lambda^{-1}(X-\mu), \quad (7)$$

and the mean vector $\lambda$ and the covariance matrix $\Lambda$ of the density can be calculated from the coordinates of the points in the CbCr color map.

In other words, given a threshold $x_T^2$, X can be classified as skin chrominance if $x^2 \leq x_T^2$ and as non-skin chrominance otherwise. The inequality $x^2 \leq x_T^2$ defines an elliptical area with a center given by μ and principal axes given by the eigenvectors $e_i$ of Λ with corresponding axes length $\lambda_T \sqrt{\lambda_i}$, where $$\sum_i e_i = \lambda_i e_i.$$

The square-root of the threshold $x_T$ is chosen such that it is large when the luminance level is at the median and gradually becomes smaller at the far edges. Therefore, sensor characterization module 16 saves the pairs of μ and Λ for each luminance range as sensor statistics 18 for image sensor 12.

Figure 7:
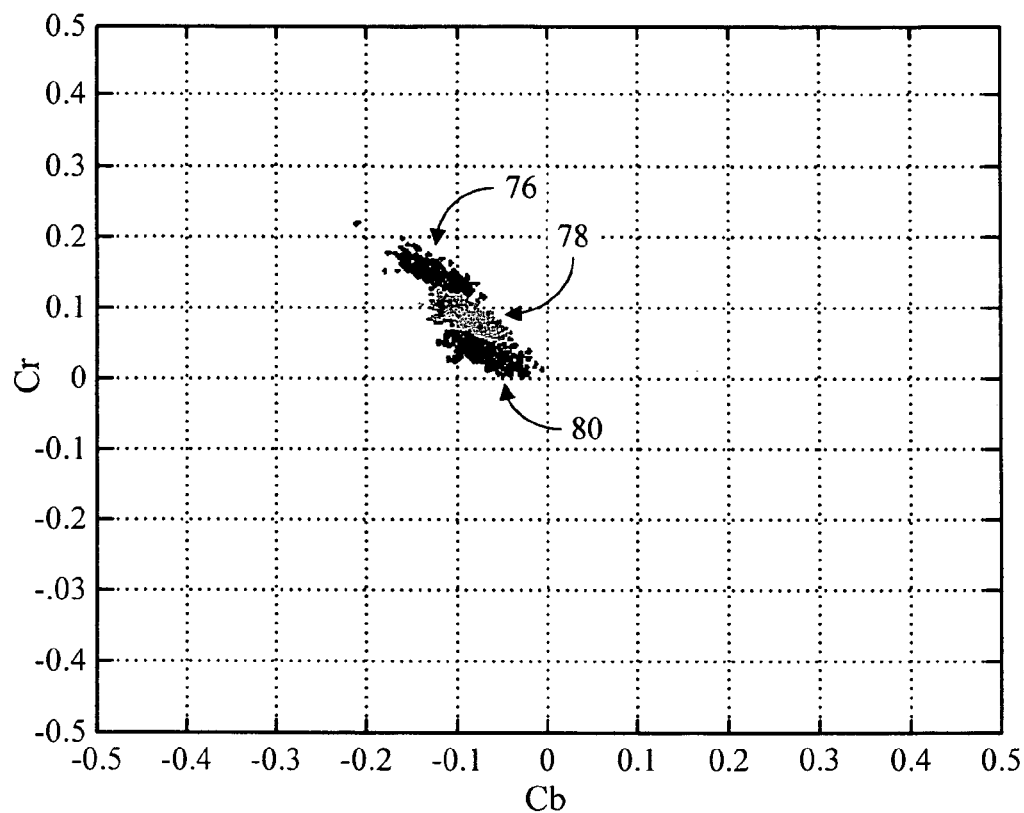
FIG. 7 is a plot of skin color regions for three different illuminant conditions over a luminance (Y) range of 0.6 to 0.7.

FIG. 7 is a plot of skin color regions for three different illuminant conditions over a luminance (Y) range of 0.6 to 0.7. Three skin color clusters 76, 78, and 80 are shown in YCbCr color space under multiple illuminants, with Cb on the horizontal axis and Cr on the vertical axis. Each of the skin color clusters 76, 78 and 80 corresponds to a different illuminant, e.g., daylight—CIE D65, tungsten light—CIE A, and fluorescent light—TL84, under which image sensor 12 images the Macbeth ColorChecker testing target. The three skin color clusters 76, 78, and 80 may not overlap each other. When image sensor 12 obtains an image scene, automatic focus control system 14 determines the illuminant condition of the image scene. In this way, the corresponding one of skin color clusters 76, 78, and 80 included in sensor statistics 18 is used as a classifier by a skin tone detector within automatic focus control system 14. In other words, the one of skin color clusters 76, 78, and 80 prepared for the same general illuminant condition is selected. For example, if the current illuminant condition approximates daylight, the one of skin color clusters 76, 78, and 80 for daylight illumination is selected.

Techniques for automated focus control based on skin tone detection within an image scene will now be described in more detail. In some embodiments, the techniques may make use of a skin color detection approach which is intrinsically sensor-dependent, as described above. The sensor-dependent skin color detection is performed once a specific sensor is characterized by taking several raw images of standard color test target in controlled illumination conditions, which itself is described in detail above. An automatic focus control technique as described herein relies on sensor-dependent skin color detection to produce high detection precision and reliability, which is different from common sensor-independent skin color detection techniques. The automatic focus technique may be effective in providing better focus for people in an image scene, and especially when those people are in front of a background which contains high spatial frequency information such as window blinds, tree branches, or the like, which could otherwise be selected for automatic focus using ordinary techniques.

Figure 8:
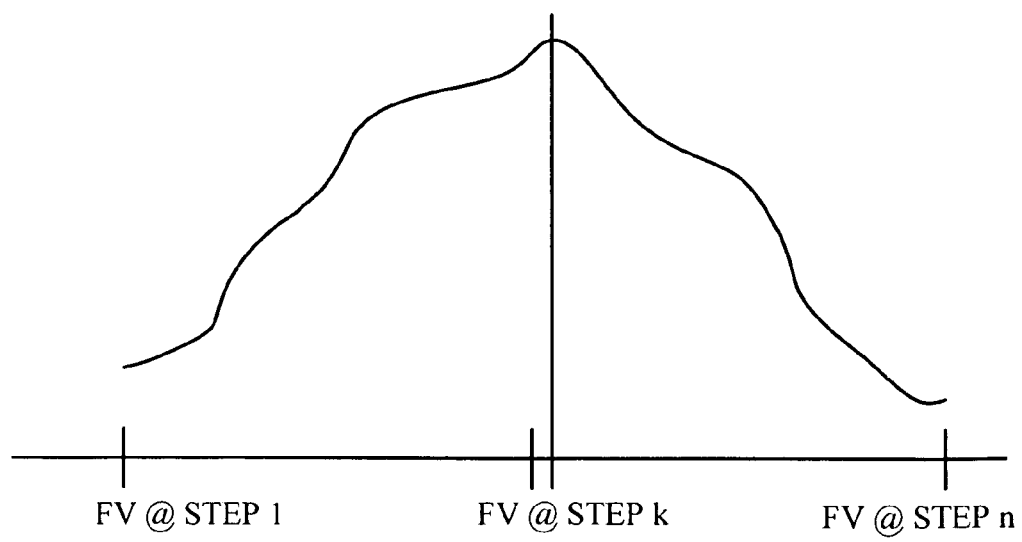
FIG. 8 is a plot of focal value (FV) over a range of focusing distance steps between a lens within a camera and an object.

FIG. 8 is a plot of focal value (FV) over a range of focusing distance steps between a lens within a camera and an object. Automatic focus control in the camera, such as camera 10 from FIG. 1, is important to obtain sharp reproduction of the object in an image scene. An image capture device within the camera may include the lens that establishes a focusing distance between the lens and the object when capturing an image of the object. In some cases, the lens may be physically movable from a default position within the camera in order to change the focusing distance. In other cases, the lens may not be physically movable and imaging processing within the camera may model focusing distance changes by altering the FV of the object within the scene.

The FV or sharpness level corresponding to a region of the scene including the object may be measured. If the region is perfectly focused, i.e., the focusing distance is perfect, the FV is the highest. But if the focusing distance deviates from this perfect focusing distance, the captured image of the region is blurred, which results in a lowered FV, as shown in FIG. 8. Accordingly, the FV is highest when a region of an image scene is perfectly focused, and correlates with sharpness in image appearance. The FV becomes lower as the focusing distance deviates from the perfect distance, and correlates with a blurry image appearance. In FIG. 8, at a short focusing distance corresponding to Step 1, the FV is relatively low. At a long focusing distance at Step n, the FV is also relatively low. At an optimum focusing distance at Step k, the FV peaks, indicating ideal focusing and desirable sharpness of the image scene. Hence, FIG. 8 shows the FV of a certain object within a scene, which peaks if the object is perfectly focused.

Conventionally, a camera may determine a proper focusing distance for a region of a scene by selecting a region of the scene with the largest amount of spatial frequency as including the main object within the scene. The camera may then perform high pass filtering of the selected region to determine the focusing distance that generates the highest FV of the region of the scene. If people are in the scene, it may be expected that the people are well focused. However, due to the fact that the FV of the region containing people may not be the highest in the scene, the camera may confuse people and a complex background with a high spatial frequency. Therefore, the people may not be focused although the background is focused.

For example, a person or other skin tone region within an image scene may not be focused in front of a background where high frequency dominates, such as vertical window blinds. As another example, a person or other skin tone region within an image scene may not be focused in front of a complex scene background where high frequency and low frequency objects are present, such as a landscape scene with trees and leaves.

To solve this problem, it is necessary to lock up a region of a scene where skin tone pixels are available. If skin tone pixels are detected in a region of the scene in an outstanding percentage, the camera can make a decision whether the regions with skin tone pixels should be focused. The camera may identify a region of the scene that includes a substantial amount of skin tone pixels as a skin region of the scene. This disclosure describes skin-tone based automatic focus control, and application of a sensor-dependent skin color detection method, as described herein, to automatic focus control. Rather than focusing on a central region of the scene or a high frequency region of the scene that may have a higher FV, the camera is controlled to focus on the detected skin region. In some embodiments, the camera may be focused on a particular sub-region of the skin region, which exhibits a high FV relative to other sub-regions. In other embodiments, skin region detection may be used as a cross correlation with high frequency region detection to support automatic focus.

Automatic focus control determines a proper focusing distance for a skin region of a scene based on skin tone detection within the scene. The camera may perform high pass filtering of the skin region to determine the focusing distance that generates the highest FV of skin region. The determined focusing distance may then be feed back to the lens within the image capture device to properly position the lens to obtain the highest FV. In this way, the automatic focus control techniques described herein may ensure people in the scene are well focused by identifying the regions of the scene containing people and performing skin tone prioritized focus control on the skin regions.

Figure 9:
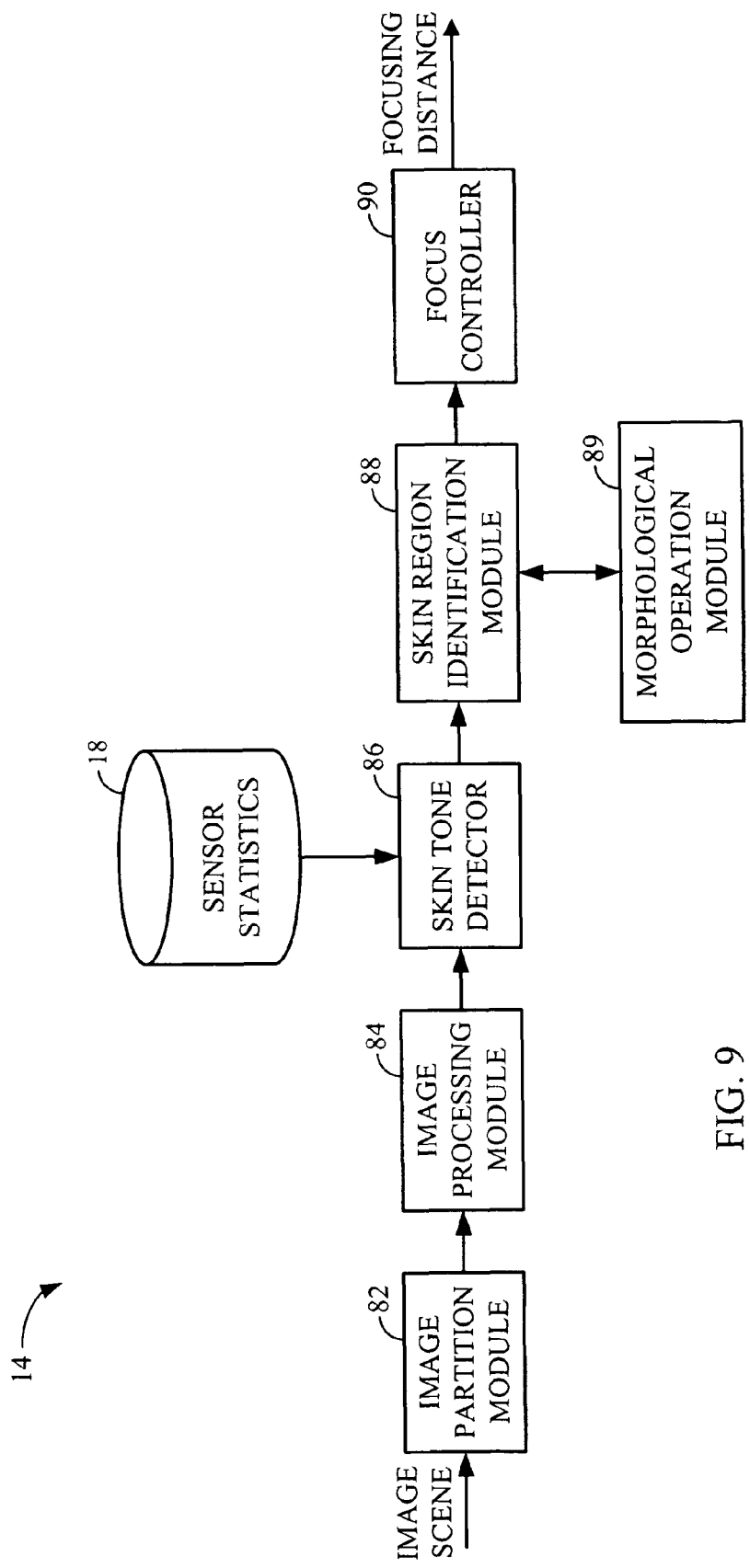
FIG. 9 is a block diagram illustrating an automatic focus control system within a camera that performs sensor-dependent skin tone detection for automatic focus control to prioritize skin tone in an image scene in accordance with an embodiment of this disclosure.

FIG. 9 is a block diagram illustrating automatic focus control system 14 within camera 10 that performs sensor-dependent skin tone detection for automatic focus control to prioritize skin tone in an image scene in accordance with an embodiment of this disclosure. Automatic focus control system 14 includes an image partition module 82, an image processing module 84, a skin tone detector 86, a skin region identification module 88, a morphological operation module 89, and a focus controller 90. As shown in FIG. 9, automatic focus control system 14 receives an image scene from image sensor 12 and sensor statistics of image sensor 12 from sensor characterization module 16.

Image partition module 82 partitions the image scene obtained by image sensor 12 into blocks containing pixels. For example, image partition module 82 may partition the image scene into 8×8 or 16×16 pixel blocks. Image processing module 84 retrieves characteristics of all the blocks within the image scene. Image processing module 84 then subjects the image scene to white balancing, focus control, and exposure control based on the retrieved characteristics. In this way, image processing module 84 determines the illuminant (e.g., daylight—CIE D65, tungsten light—CIE A, or fluorescent light—TL84) of the received image scene. In addition, image processing module 84 may determine a focusing distance for the image scene based on a central or background region of the image scene. As described above, this focusing distance may result in blurry skin tone regions, i.e., people, within the image scene.

Skin tone detector 86 then uses sensor statistics 18 of the determined illuminant to detect skin tone pixels within the image scene. Skin tone detector 86 may perform a relatively simple detection process after the generation of sensor statistics 18 of image sensor 12 by sensor characterization module 16. In this case, skin region detector 32 checks whether the chrominance (CbCr) values are inside the ellipses characterized by sensor statistics 18 for the determined illuminant. In this way, the skin tone detection process described herein may be more accurate than a conventional skin tone training approach trained by a large volume of images without any knowledge.

Skin region identification module 88 then determines which of the blocks within the image scene include the detected skin tone pixels. Skin region identification module 88 may identify the blocks that contain at least a predefined percentage of the detected skin tone pixels as skin regions within the image scene. In this case, skin region identification module 88 may select more than one skin region for the image scene. In other cases, skin region identification module 88 may only identify the block that contains the largest percentage of the detected skin tone pixels as the skin region of the image scene. In still other cases, skin region identification module 88 may only identify the block with the largest area of the image scene that contains at least a predefined percentage of the detected skin tone pixels as the skin region of the image scene.

Morphological operation module 89 removes speckles from the identified skin region of the image scene using open/close or regional labeling techniques. Focus controller 90 retrieves characteristics of the identified skin region within the image scene. Focus controller 90 then subjects the skin region within the image scene to automatic focus control based on the retrieved characteristics of the skin region. In this way, image processing module 84 may determine a focusing distance for the identified skin region of the image scene based on skin tone detection within the image scene.

Focus controller 90 then outputs the determined focusing distance to image capture device 11 within camera 10 to position the lens within image capture device 11 to establish the proper FV of the skin region within the image scene. In this way, automatic focus control system 14 applies the skin tone based focusing distance to the entire image scene. As described above, the determined focusing distance may result in perfectly focused skin tone regions, i.e., people, within the image scene.

In the case where skin region identification module 88 identifies more than one skin region within the image scene, focus controller 90 may determine a focusing distance based on an average of the highest FV for each of the identified skin regions. In other cases, focus controller 90 may determine a focusing distance based on the highest FV of the skin region with the largest area of the image scene.

Figure 10:
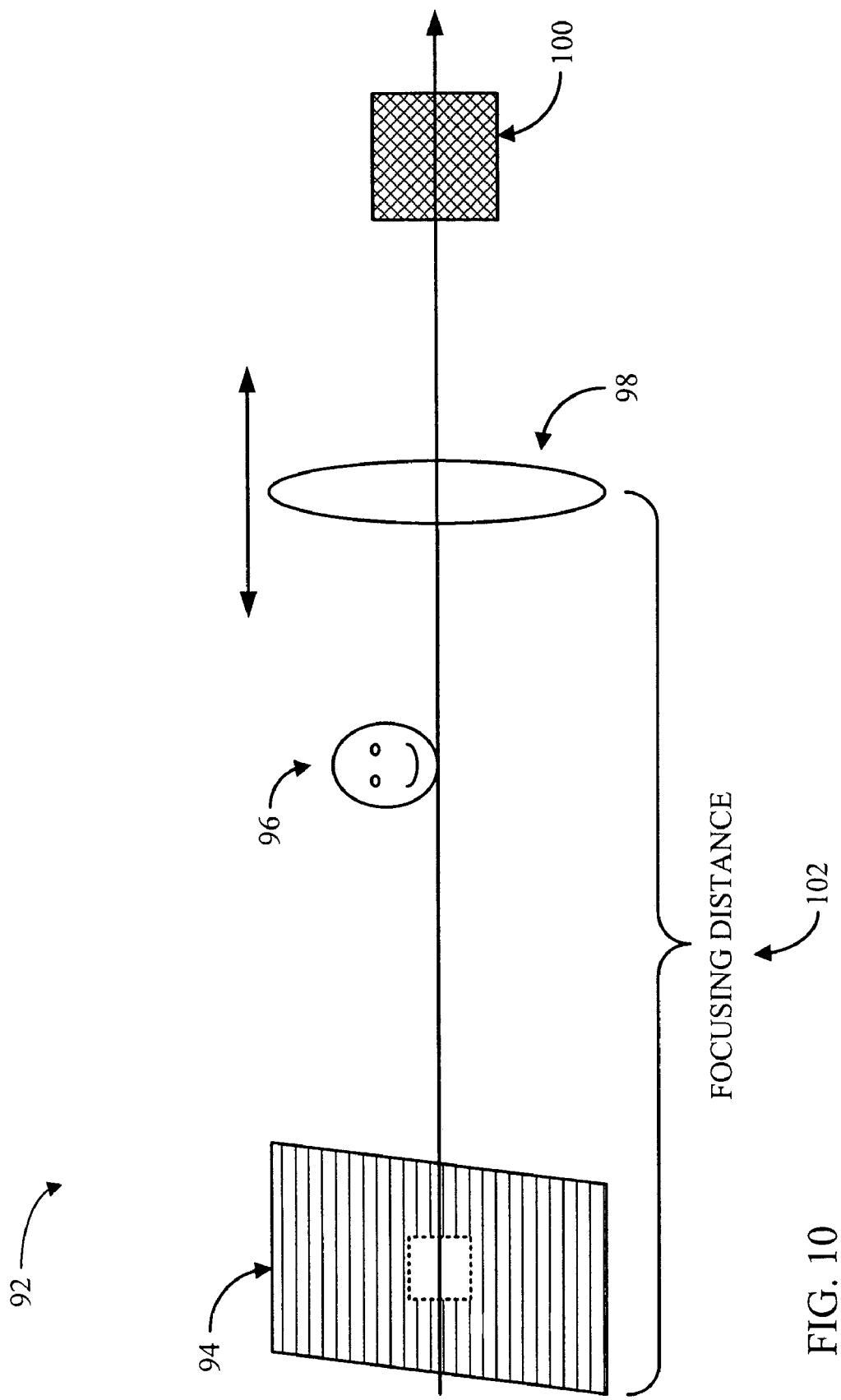
FIG. 10 illustrates an exemplary image capture setup that implements automatic focus control techniques that prioritize focus of an image scene based on skin tone.

FIG. 10 illustrates an exemplary image capture setup 92 that implements automatic focus control techniques that prioritize focus of an image scene based on skin tone. As described above, the automatic focus control techniques may use a skin color detection approach which is intrinsically image sensor-dependent. Image capture setup 92 includes a scene with a background 94 and a person 96, i.e., a skin tone region, and a camera with a lens 98 and an image sensor 100. As shown in FIG. 10, lens 98 may move relative to image sensor 100 in order to change a focusing distance 102 between lens 98 and the scene from close to far. Image capture setup 92 illustrates how the position of lens 98 is controlled relative to image sensor 100 to automatically focus the camera.

To verify the automatic focus control techniques described in this disclosure, an experiment was conducted to illustrate the changing FV on the central region of the image scene and the identified skin region of the same image scene while the focusing distance manually changes from close to far. The results of the experiment using image capture setup 92 from FIG. 10 are illustrated in FIGS. 11A-11G.

FIGS. 11A-11G are a series of captured images including the associated skin color detection as well as the change of FV for a certain focusing distance step. Each of FIGS. 11A-11G shows a captured image, a version of the image highlighting an identified skin tone region, and a graph illustrating FV versus focusing distance, according to the experiment outlined in FIG. 10. FIGS. 11A-11G illustrates 7 out of the 19 focusing distance steps used in the experiment.

In each of FIGS. 11A-11G, the x-line on the graph indicates the FV, which is representative of relative sharpness, for a central or background region (FV Center) of the captured image. The diamond-line on the graph indicates the FV for a skin region (FV Skin) of the captured image, i.e., the human face shown in each captured image. Each graph plots log 10 FV value versus object distance from close to far. The automatic focus control techniques described herein identify a maximum FV for the skin region (FIG. 11D) as well as a maximum FV for the central region of the image scene (FIG. 11F).

FIG. 11A illustrates the image scene and FV at focusing distance step 1 (10 cm). FIG. 11B illustrates the image scene and FV at focusing distance step 5 (18 cm). FIG. 11C illustrates the image scene and FV at focusing distance step 10 (60 cm). FIG. 11D illustrates the image scene and FV at focusing distance step 13 (90 cm). Focusing distance step 13 provides the highest FV for the identified skin tone region of the image scene. FIG. 11E illustrates the image scene and FV at focusing distance step 14 (100 cm). FIG. 11F illustrates the image scene and FV at focusing distance step 15 (150 cm). Focusing distance step 15 provides the highest FV for the central or background region of the image scene. FIG. 11G illustrates the image scene and FV at focusing distance step 19 (800 cm).

As described above, a camera may determine a proper focusing distance for a region of a scene by selecting a region of the scene with the largest amount of spatial frequency as including the main object within the scene. Therefore, the central region of the image scene from FIGS. 11A-11G would include the high frequency vertical window blinds as the main object of the image scene. In this case, if the central region of the scene is used to determine the focusing distance, the face presented in the image cannot be well focused because it is not in the central region, but rather to the side.

However, the skin tone prioritized automatic focus control techniques can automatically control the camera focus mechanism to switch to the identified skin region that includes the face once the skin tone pixels are detected. In this way, the correct focusing of people within an image scene can be guaranteed. In particular, once the skin region is identified, focusing can be controlled to apply optimal focusing to the skin region rather than a central region of the image scene, if the central region does not also correspond to the skin region.

Figure 12:
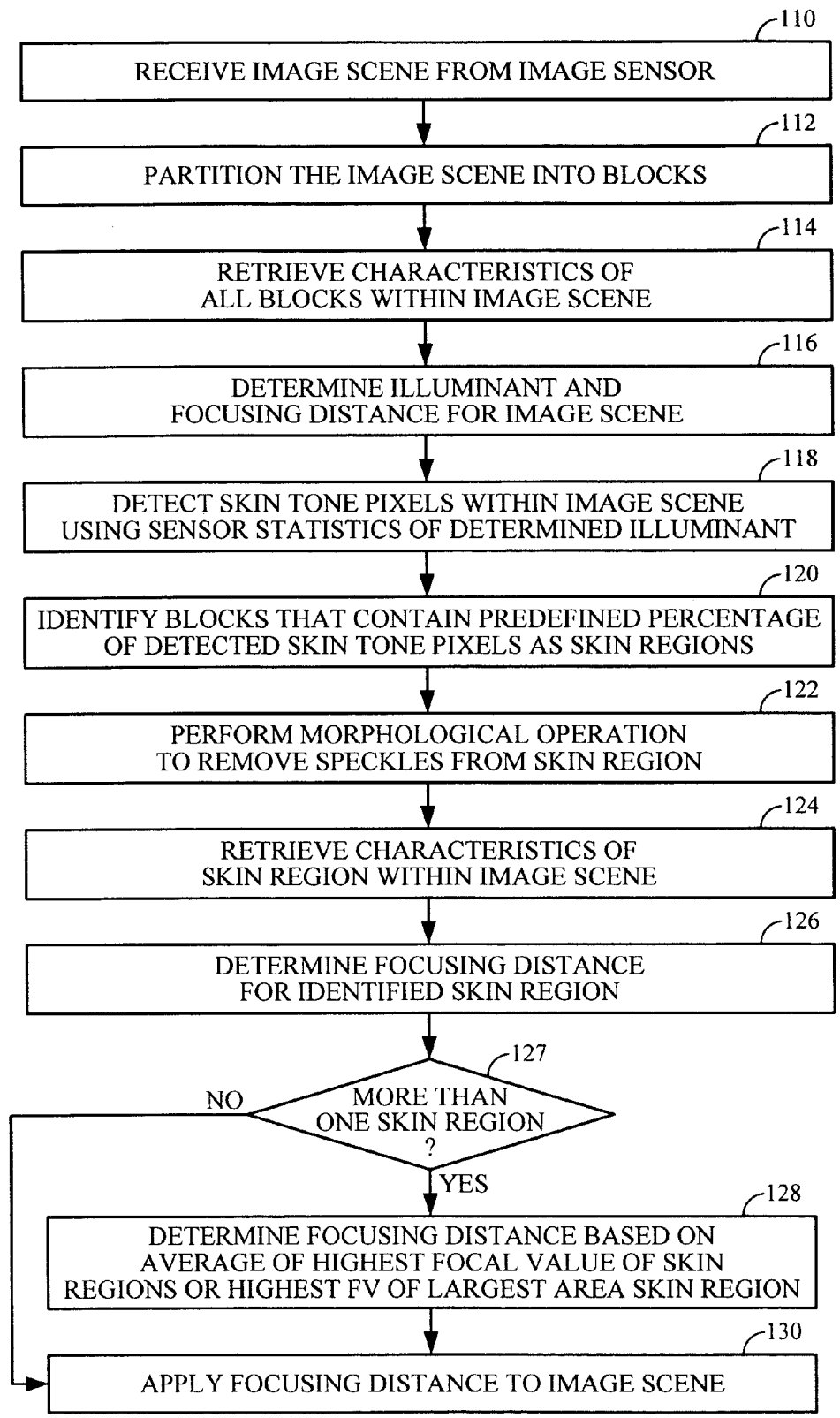
FIG. 12 is a flowchart illustrating operation of an automatic focus control system included in a camera based on characteristics of an image sensor.

FIG. 12 is a flowchart illustrating operation of automatic focus control system 14 included in camera 10 based on characteristics of image sensor 12. The operation will be described herein in reference to FIG. 9. As described above, automatic focus control system 14 performs sensor-dependent skin tone detection for automatic focus control to prioritize skin tone in an image scene in accordance with an embodiment of this disclosure. In other embodiments, automatic focus control system 14 may perform another type of skin tone detection that is not intrinsically sensor-dependent.

Automatic focus control system 14 receives an image scene from image sensor 12 (110). Image partition module 82 within automatic focus control system 14 partitions the image scene obtained by image sensor 12 into blocks containing pixels (112). For example, image partition module 82 may partition the image scene into 8×8 or 16×16 pixel blocks. Image processing module 84 retrieves characteristics of all the blocks within the image scene (114). Image processing module 84 then subjects the image scene to white balancing, focus control, and exposure control based on the retrieved characteristics. In this way, image processing module 84 determines the illuminant of the received image scene and a focusing distance for the image scene based on a central or background region of the image scene (116). As described above, this focusing distance may result in blurry skin tone regions, i.e., people, within the image scene.

Skin tone detector 86 then uses sensor statistics 18 of the determined illuminant to detect skin tone pixels within the image scene (118). Skin tone detector 86 may perform a relatively simple detection process after the generation of sensor statistics 18 of image sensor 12 by sensor characterization module 16. In this case, skin region detector 32 checks whether the chrominance (CbCr) values are inside the ellipses characterized by sensor statistics 18 for the determined illuminant. In this way, the skin tone detection process described herein may be more accurate than a conventional skin tone training approach trained by a large volume of images without any knowledge.

Skin region identification module 88 then determines which of the blocks within the image scene include the detected skin tone pixels. Skin region identification module 88 may identify the blocks that contain at least a predefined percentage of the detected skin tone pixels as skin regions within the image scene (120). In this case, skin region identification module 88 may select more than one skin region for the image scene. In other cases, skin region identification module 88 may only identify the block that contains the largest percentage of the detected skin tone pixels as the skin region of the image scene. In still other cases, skin region identification module 88 may only identify the block with the largest area of the image scene that contains at least a predefined percentage of the detected skin tone pixels as the skin region of the image scene.

In some embodiments, automatic focus control system 14 may include a morphological operation module that removes speckles from the identified skin region of the image scene using open/close or regional labeling techniques (122). Focus controller 90 retrieves characteristics of the identified skin region within the image scene (124). Focus controller 90 then subjects the skin region within the image scene to automatic focus control based on the retrieved characteristics of the skin region. In this way, image processing module 84 may determine a focusing distance for the identified skin region of the image scene based on a skin tone detection within the image scene (126).

If skin region identification module 88 identifies more than one skin region within the image scene (yes branch of 127), focus controller 90 may determine a focusing distance based on an average of the highest FV for each of the identified skin regions or on the highest FV of the skin region with the largest area of the image scene (128).

Regardless of the number of skin regions identified within the image scene, focus controller 90 outputs the determined focusing distance to image capture device 11 within camera 10 to position the lens within image capture device 11 to establish the proper FV of the skin region within the image scene. In this way, automatic focus control system 14 applies the skin tone based focusing distance to the entire image scene (130). As described above, the determined focusing distance may result in perfectly focused skin tone regions, i.e., people, within the image scene.

It should be understood that any discussion of color theory above serves to explain a motivation of the principles described herein and to disclose contemplated applications and extensions of such principles. No aspect of such discussion shall be limiting to any claimed structure or method unless such intent is expressly indicated by setting forth that aspect in the particular claim.

The foregoing presentation of the described embodiments is provided to enable any person skilled in the art to make or use the present invention. Various modifications to these embodiments are possible, and the generic principles presented herein may be applied to other embodiments as well. Methods as described herein may be implemented in hardware, software, and/or firmware. The various tasks of such methods may be implemented as sets of instructions executable by one or more arrays of logic elements, such as microprocessors, embedded controllers, or IP cores. In one example, one or more such tasks are arranged for execution within a mobile station modem chip or chipset that is configured to control operations of various devices of a personal communications device such as a cellular telephone.

The techniques described in this disclosure may be implemented within a general purpose microprocessor, digital signal processor (DSP), application specific integrated circuit (ASIC), field programmable gate array (FPGA), or other equivalent logic devices. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

As further examples, an embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

Although CCD and CMOS sensors are mentioned herein, the term "sensor" includes any sensor having a plurality of light-sensitive sites or elements, including amorphous and crystalline silicon sensors as well as sensors created using other semiconductors and/or heterojunctions. Thus, the range of embodiments is not intended to be limited to those shown above but rather is to be accorded the widest scope consistent with the principles and novel features disclosed in any fashion herein In this disclosure, various techniques have been described for automatic focus control in a camera based on skin tone detection within an image scene. The automatic focus control techniques prioritize focus based on skin tone, and may use a skin color detection approach which is intrinsically image sensor-dependent. Sensor-dependent skin color detection to support automatic skin tone prioritized focus control in a camera can enhance the focus of people in the scene. The techniques may be especially useful in digital video camera design, digital still photo camera design, and sensor applications involving people tracking.

For example, sensor-dependent skin color detection is performed once a specific image sensor included in a camera is characterized by taking several raw images of a standard color test target in controlled illumination conditions. Sensor-dependent skin color detection can provide high detection precision and reliability, which is different from the common sensor-independent skin color detection. With sensor-dependent skin color detection, the focus of a camera can be automatically adjusted to prioritize regions of an image scene containing skin tones. These and other embodiments are within the scope of the following claims.

The invention claimed is:

1. A method of automatically controlling focus of a camera comprising:
   characterizing an image sensor included in the camera by obtaining a plurality of images of a color testing target in controlled illumination conditions, comprising:
      obtaining a set of values in a color space based on a response by the image sensor to a corresponding one of a plurality of color testing targets, each of the plurality of color testing targets having a different reflectance spectrum;
      obtaining a set of values based on a correlation between a reflectance spectrum of a training surface and a combination of reflectance spectra of the plurality of color testing targets; and
      based on the correlation, obtaining a predicted response of the image sensor to the training surface;
   obtaining an image scene with the image sensor included in the camera;
   identifying one or more regions of the image scene including skin tone pixels by using the characterization of the image sensor; and
   automatically controlling focus of the camera based on the identified one or more regions.

2. The method of claim 1, wherein automatically controlling focus of the camera includes controlling focus to emphasize the identified one or more regions.

3. The method of claim 1, wherein automatically controlling focus of the camera includes controlling a focusing distance of a lens within the camera.

4. The method of claim 1, further comprising retrieving characteristics of the image scene and determining an illuminant condition of the image scene based on the retrieved characteristics.

5. The method of claim 4, further comprising determining a focusing distance for a central region of the image scene based on the retrieved characteristics.

6. The method of claim 4, wherein determining an illuminant condition comprises selecting one of a daylight condition, a tungsten light condition, or a fluorescent light condition.

7. The method of claim 4, further comprising:
   generating sensor statistics for the image sensor for each illuminant condition; and
   detecting skin tone pixels within the image scene based on the sensor statistics for the illuminant condition of the image scene.

8. The method of claim 1, wherein identifying the one or more regions of the image scene comprises identifying one or more skin regions of the image scene that include at least a predetermined percentage of the skin tone pixels.

9. The method of claim 1, wherein identifying the one or more regions of the image scene comprises identifying a skin region of the image scene that includes the largest number of the skin tone pixels.

10. The method of claim 1, wherein identifying the one or more regions of the image scene comprises identifying a skin region of the image scene that includes the largest area of the image scene and at least a predefined percentage of the skin tone pixels.

11. The method of claim 1, further comprising partitioning the image scene into a plurality of blocks including a predetermined number of pixels, wherein identifying the one or more regions of the image scene comprises identifying one or more skin regions from the plurality of blocks that include skin tone pixels.

12. The method of claim 1, further comprising performing morphological operations on the identified one or more regions of the image scene to remove speckles from the one or more regions.

13. The method of claim 1, wherein automatically controlling focus of the camera comprises:
   retrieving characteristics of the identified one or more regions of the image scene;
   determining a focusing distance based on focal values of each of the identified one or more regions of the image scene; and
   applying the determined focusing distance to the image scene.

14. The method of claim 13, wherein applying the determined focusing distance comprises moving a lens within the camera to a location that establishes the determined focusing distance between the lens and an object included in the identified one or more regions of the image scene.

15. The method of claim 1, wherein determining the focusing distance comprises determining the focusing distance based on the highest focal value of one of the identified regions of the image scene.

16. The method of claim 1, wherein determining the focusing distance comprises determining the focusing distance based on an average of the highest focal value of each of the identified regions of the image scene.

17. The method of claim 1, wherein determining the focusing distance comprises determining the focusing distance based on the highest focal value of one of the identified regions with the largest area of the image scene.

18. The method of claim 1, further comprising obtaining a predicted response of the image sensor to each of a plurality of human skin tone training surfaces.

19. The method of claim 1, further comprising obtaining different sets of values in the color space based on a response by the image sensor to a corresponding one of the plurality of color testing targets under different illuminants having different spectral power distributions.

20. A computer-readable medium for automatically controlling focus of a camera, the computer-readable medium comprising instructions that cause the programmable processor to:
- characterize an image sensor included in the camera by obtaining a plurality of images of a color testing target in controlled illumination conditions, wherein the instructions cause the programmable processor to:
  - obtain a set of values in a color space based on a response by the image sensor to a corresponding one of a plurality of color testing targets, each of the plurality of color testing targets having a different reflectance spectrum;
  - obtain a set of values based on a correlation between a reflectance spectrum of a training surface and a combination of reflectance spectra of the plurality of color testing targets; and
  - based on the correlation, obtain a predicted response of the image sensor to the training surface;
- obtain an image scene with the image sensor included in the camera;
- identify one or more regions of the image scene including skin tune pixels by using the characterization of the image sensor; and
- automatically control focus of the camera based on the identified one or more regions.

21. The computer-readable medium of claim 20, wherein the instructions cause the programmable processor to control focus to emphasize the identified one or more regions.

22. The computer-readable medium of claim 20, wherein the instructions cause the programmable processor to control a focusing distance of a lens within the camera.

23. The computer-readable medium of claim 20, further comprising instructions that cause the programmable processor to retrieve characteristics of the image scene and determine an illuminant condition of the image scene based on the retrieved characteristics.

24. The computer-readable medium of claim 23, further comprising instructions that cause the programmable processor to determine a focusing distance for a central region of the image scene based on the retrieved characteristics.

25. The computer-readable medium of claim 23, further comprising instructions that cause the programmable processor to:
- generate sensor statistics for the image sensor for each illuminant condition; and
- detect skin tone pixels within the image scene based on the sensor statistics for the illuminant condition of the image scene.

26. The computer-readable medium of claim 20, further comprising instructions that cause the programmable processor to partition the image scene into a plurality of blocks including a predetermined number of pixels, wherein the instructions cause the programmable processor to identify one or more skin regions from the plurality of blocks that include skin tone pixels.

27. The computer-readable medium of claim 20, further comprising instructions that cause the programmable processor to perform morphological operations on the identified one or more regions of the image scene to remove speckles from the one or more regions.

28. The computer-readable medium of claim 20, wherein the instructions that cause the programmable processor to automatically control focus of the camera cause the programmable processor to:
- retrieve characteristics of the identified one or more regions of the image scene;
- determine a focusing distance based on focal values of each of the identified one or more regions of the image scene; and
- apply the determined focusing distance to the image scene.

29. The computer-readable medium of claim 28, wherein the instructions cause the programmable processor to move a lens within the camera to a location that establishes the determined focusing distance between the lens and an object included in the identified one or more regions of the image scene.

30. An imaging device comprising:
- an image sensor configured to obtain an image scene;
- a sensor characterization module that characterizes the image sensor by obtaining a plurality of images of a color testing target in controlled illumination conditions, wherein the sensor characterization module is configured to:
  - obtain a set of values in a color space based on a response by the image sensor to a corresponding one of a plurality of color testing targets, each of the plurality of color testing targets having a different reflectance spectrum;
  - obtain a set of values based on a correlation between a reflectance spectrum of a training surface and a combination of reflectance spectra of the plurality of color testing targets; and
  - based on the correlation, obtain a predicted response of the image sensor to the training surface;
- a skin region identification module that identifies, in an image scene obtained by the image sensor, one or more regions of the image scene including skin tone pixels by using the characterization of the image sensor; and
- a focus controller that automatically controls focus of the imaging device based on the identified one or more regions.

31. The imaging device of claim 30, wherein the focus controller controls focus to emphasize the identified one or more regions.

32. The imaging device of claim 30, wherein the focus controller controls a focusing distance of a lens within the imaging device.

33. The imaging device of claim 30, further comprising an image processing module that retrieves characteristics of the image scene and determines an illuminant condition of the image scene based on the retrieved characteristics.

34. The imaging device of claim 33, wherein the image processing module determines a focusing distance for a central region of the image scene based on the retrieved characteristics.

35. The imaging device of claim 33, wherein the image processing module selects the illuminant condition from one of a daylight condition, a tungsten light condition, or a fluorescent light condition.

36. The imaging device of claim 33, further comprising:
a sensor characterization module that generates sensor statistics for the image sensor for each illuminant condition; and
a skin tone detector that detects skin tone pixels within the image scene based on the sensor statistics for the illuminant condition of the image scene.

37. The imaging device of claim 30, wherein the skin region identification module identifies one or more skin regions of the image scene that include at least a predetermined percentage of the skin tone pixels.

38. The imaging device of claim 30, wherein the skin region identification module identifies a skin region of the image scene that includes the largest number of the skin tone pixels.

39. The imaging device of claim 30, wherein imaging device identifies a skin region of the image scene that includes the largest area of the image scene and at least a predefined percentage of the skin tone pixels.

40. The imaging device of claim 30, further comprising an image partitioning module that partitions the image scene into a plurality of blocks including a predetermined number of pixels, wherein the skin region identification module identifies one or more skin regions from the plurality of blocks that include skin tone pixels.

41. The imaging device of claim 30, further comprising a morphological operation module that performs morphological operations on the identified one or more regions of the image scene to remove speckles from the one or more regions.

42. The imaging device of claim 30, wherein the focus controller:
retrieves characteristics of the identified one or more regions of the image scene;
determines a focusing distance based on focal values of each of the identified one or more regions of the image scene; and
applies the determined focusing distance to the image scene.

43. The imaging device of claim 42, wherein the focus controller moves a lens within the imaging device to a location that establishes the determined focusing distance between the lens and an object included in the identified one or more regions of the image scene to apply the determined focusing distance to the image scene.

44. The imaging device of claim 30, wherein the focus controller determines the focusing distance based on the highest focal value of one of the identified regions of the image scene.

45. The imaging device of claim 30, wherein the focus controller determines the focusing distance based on an average of the highest focal value of each of the identified regions of the image scene.

46. The imaging device of claim 30, wherein the focus controller determines the focusing distance based on the highest focal value of one of the identified regions with the largest area of the image scene.

47. The imaging device of claim 30, wherein the sensor characterization module obtains a predicted response of the image sensor to each of a plurality of human skin tone training surfaces.

48. The imaging device of claim 30, wherein the sensor characterization module obtains different sets of values in the color space based on a response by the image sensor to a corresponding one of the plurality of color testing targets under different illuminants having different spectral power distributions.

49. An imaging device, comprising:
means for characterizing an image sensor included in the camera by obtaining a plurality of images of a color testing target in controlled illumination conditions, comprising:
means for obtaining a set of values in a color space based on a response by the image sensor to a corresponding one of a plurality of color testing targets, each of the plurality of color testing targets having a different reflectance spectrum;
means for obtaining a set of values based on a correlation between a reflectance spectrum of a training surface and a combination of reflectance spectra of the plurality of color testing targets;
means for obtaining a predicted response of the image sensor to the training surface based on the correlation;
means for obtaining an image scene with the image sensor included in the camera;
means for identifying one or more regions of the image scene including skin tone pixels by using the characterization of the image sensor; and
means for automatically controlling focus of the camera based on the identified one or more regions.

50. The imaging device of claim 49, wherein the means for automatically controlling focus comprises a focus controller which controls focus to emphasize the identified one or more regions.

51. The imaging device of claim 49, wherein the means for characterizing an image sensor comprises an image processing module that retrieves characteristics of the image scene and determines an illuminant condition of the image scene based on the retrieved characteristics.

* * * * *

UNITED STATES PATENT AND TRADEMARK OFFICE
CERTIFICATE OF CORRECTION

PATENT NO. : 7,728,904 B2  
APPLICATION NO. : 11/402481  
DATED : June 1, 2010  
INVENTOR(S) : Quan et al.

Page 1 of 1

It is certified that error appears in the above-identified patent and that said Letters Patent is hereby corrected as shown below:

Column 19, line 23, claim 20: "the programmable processor" to read as --a programmable processor--

Column 19, line 44, claim 20: "tune" to read as --tone--

Signed and Sealed this
Twelfth Day of July, 2011

David J. Kappos
*Director of the United States Patent and Trademark Office*